US012786915B2

(12) United States Patent
Guo et al.

(10) Patent No.: US 12,786,915 B2
(45) Date of Patent: Nov. 3, 2026

(54) UPLINK TIMING ALIGNMENT FOR MULTIPLE TRANSMISSION POINTS

(71) Applicant: ZTE Corporation, Shenzhen (CN)

(72) Inventors: Xiaolong Guo, Shenzhen (CN); Bo Gao, Shenzhen (CN); Shujuan Zhang, Shenzhen (CN); Yang Zhang, Shenzhen (CN); Ke Yao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 285 days.

(21) Appl. No.: 18/534,249

(22) Filed: Dec. 8, 2023

(65) Prior Publication Data

US 2024/0224210 A1 Jul. 4, 2024

Related U.S. Application Data

(63) Continuation of application No. PCT/CN2022/089399, filed on Apr. 26, 2022.

(51) Int. Cl.

| | |
|---|---|
| ***H04W 56/00*** | (2009.01) |
| ***H04L 5/00*** | (2006.01) |
| ***H04W 72/232*** | (2023.01) |
| ***H04W 74/0833*** | (2024.01) |
| ***H04W 76/20*** | (2018.01) |

(52) U.S. Cl.

CPC ....... *H04W 56/0045* (2013.01); *H04L 5/0051* (2013.01); *H04W 72/232* (2023.01); *H04W 74/0833* (2013.01); *H04W 76/20* (2018.02)

(58) Field of Classification Search

CPC .......................... H04W 56/0045; H04W 76/20

See application file for complete search history.

(56) References Cited

U.S. PATENT DOCUMENTS

2020/0100201 A1* 3/2020 Farmanbar ........ H04W 56/0045
2021/0051710 A1* 2/2021 Cirik .................... H04B 7/0608

(Continued)

FOREIGN PATENT DOCUMENTS

CN 102547968 A 7/2012
CN 111492701 A 8/2020

(Continued)

OTHER PUBLICATIONS

EPO, Extended European search report, European Application No. 22938959.8, mailed Jan. 27, 2025, 8 pages.

(Continued)

*Primary Examiner* — Zhiren Qin

(74) *Attorney, Agent, or Firm* — Ashurst Perkins Coie US LLP

(57) ABSTRACT

Methods, apparatus, and systems that enable reliable uplink timing alignment with multiple transmission points are disclosed. In one example aspect, a method for wireless communication includes receiving, by a terminal device, a message comprising a timing advance command and determining, by the terminal device, at least one transmission parameter based on the message. The at least one transmission parameter is associated with the timing advance command. The method also includes applying, by the terminal device, the timing advance command to a transmission associated with the at least one transmission parameter.

18 Claims, 13 Drawing Sheets

200

(56) References Cited

U.S. PATENT DOCUMENTS

| | | | | |
|---|---|---|---|---|
| 2021/0337525 | A1* | 10/2021 | Rahman | H04B 7/0404 |
| 2022/0078734 | A1 | 3/2022 | Zhang et al. | |
| 2022/0217725 | A1* | 7/2022 | Bai | H04B 7/01 |
| 2022/0255591 | A1* | 8/2022 | Park | H04B 17/328 |
| 2023/0209538 | A1* | 6/2023 | Cirik | H04W 72/231<br>370/329 |
| 2023/0239748 | A1* | 7/2023 | Xu | H04L 5/0023<br>370/331 |
| 2023/0337313 | A1* | 10/2023 | Yi | H04B 7/06964 |
| 2024/0357529 | A1* | 10/2024 | Nilsson | H04W 56/0045 |
| 2024/0414674 | A1* | 12/2024 | Xu | H04W 74/0833 |

FOREIGN PATENT DOCUMENTS

| | | | |
|---|---|---|---|
| CN | 112770384 | A | 5/2021 |
| WO | 2020215108 | A2 | 10/2020 |
| WO | 2021226610 | A2 | 11/2021 |
| WO | 2021253056 | A2 | 12/2021 |

OTHER PUBLICATIONS

Apple Inc., "On Further MIMO Enhancement Beyond Rel-17," 3GPP TSG RAN WG1 #108-e, e-Meeting, R1-2201763, Feb. 21-Mar. 3, 2022, 5 pages.

Ericsson, "Our views on Rel-18 MIMO WI content," 3GPP TSG RAN WG1 #106b-e, e-Meeting, Tdoc R1-2109836, Oct. 11-19, 2021, 18 pages.

Sharp, "Two TAs for multi-DCI," 3GPP TSG RAN WG1 #109-e, e-Meeting, R1-2204507, May 9-20, 2022, 2 pages.

New H3C, "Discussions on increased number of orthogonal DMRS ports", 3GPP TSG RAN WG1 #109-e, e-Meeting, R1-2203403, May 9-20, 2022, 3 pages.

CNIPA, First Office Action for Chinese Application No. 202280038628.3, mailed on Sep. 30, 2025, 20 pages with unofficial English translation.

International Search Report and Written Opinion for International Application No. PCT/CN2022/089399, mailed on Dec. 15, 2022 (9 pages).

Huawei et al., "Maintenance of Uplink Time Alignment in NR," 3GPP TSG RAN WG2 #99bis, Prague, Czech Republic, R2-1711438, Oct. 9-13, 2017, 3 pages.

CNIPA, Notice to Grant a Patent and Notification of Patent Registration, Chinese Application No. 202280038628.3, mailed May 22, 2026, 2 pages.

* cited by examiner

100

200

UPLINK TIMING ALIGNMENT FOR MULTIPLE TRANSMISSION POINTS

CROSS-REFERENCE TO RELATED APPLICATION

This application is a continuation and claims priority to International Application No. PCT/CN2022/089399, filed on Apr. 26, 2022, the disclosure of which is hereby incorporated by reference herein in its entirety.

TECHNICAL FIELD

This patent document is directed to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that enable reliable uplink timing alignment with multiple transmission points (e.g., base stations, cells, antenna panels).

In one example aspect, a method for wireless communication includes receiving, by a terminal device, a message comprising a timing advance command and determining, by the terminal device, at least one transmission parameter based on the message. The at least one transmission parameter is associated with the timing advance command. The method also includes applying, by the terminal device, the timing advance command to a transmission associated with the at least one transmission parameter.

In another example aspect, a method for wireless communication includes transmitting, by a serving cell in a cell group, a message to a terminal device. The message comprises a time advance command that enables the terminal device to apply the time advance command to a transmission associated with at least one transmission parameter that is associated with the timing advance command.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

In wireless communications, downlink (DL) and uplink (UL) synchronization are steps taken to ensure reliable wireless communications between terminal devices and the serving cells. In particular, primary synchronization signal (PSS) and secondary synchronization signal (SSS) are used to achieve downlink synchronization. Uplink timing alignment (e.g., in Random access procedures) are used to achieve uplink synchronization. Random access procedures can be initiated using a Downlink Control Information (DCI) signaling message with a specific format (e.g., DCI format 1_0) for a Physical Downlink Control Channel (PDCCH) order. Alternatively, or in addition, the random-access procedure can be initiated via Medium Access Control (MAC) or Radio Resource Control (RRC) signaling. When downlink data arrives for a User Equipment (UE) that is in an RRC_CONNECTED state, and when UE is in an uplink out-of-sync state, the network schedules a DCI message in format 1_0 to inform the UE that a random-access procedure needs to be initiated. When uplink data arrives for a UE that is in the RRC_CONNECTED state, and when UE is in the uplink out-of-sync state, UE selects a preamble to initiate random access procedure. It is noted that, in this patent document, the term "PDCCH" can be used interchangeably with the term "DCI" to refer to the DCI signaling messages transmitted on the PDCCH.

Figure 1:
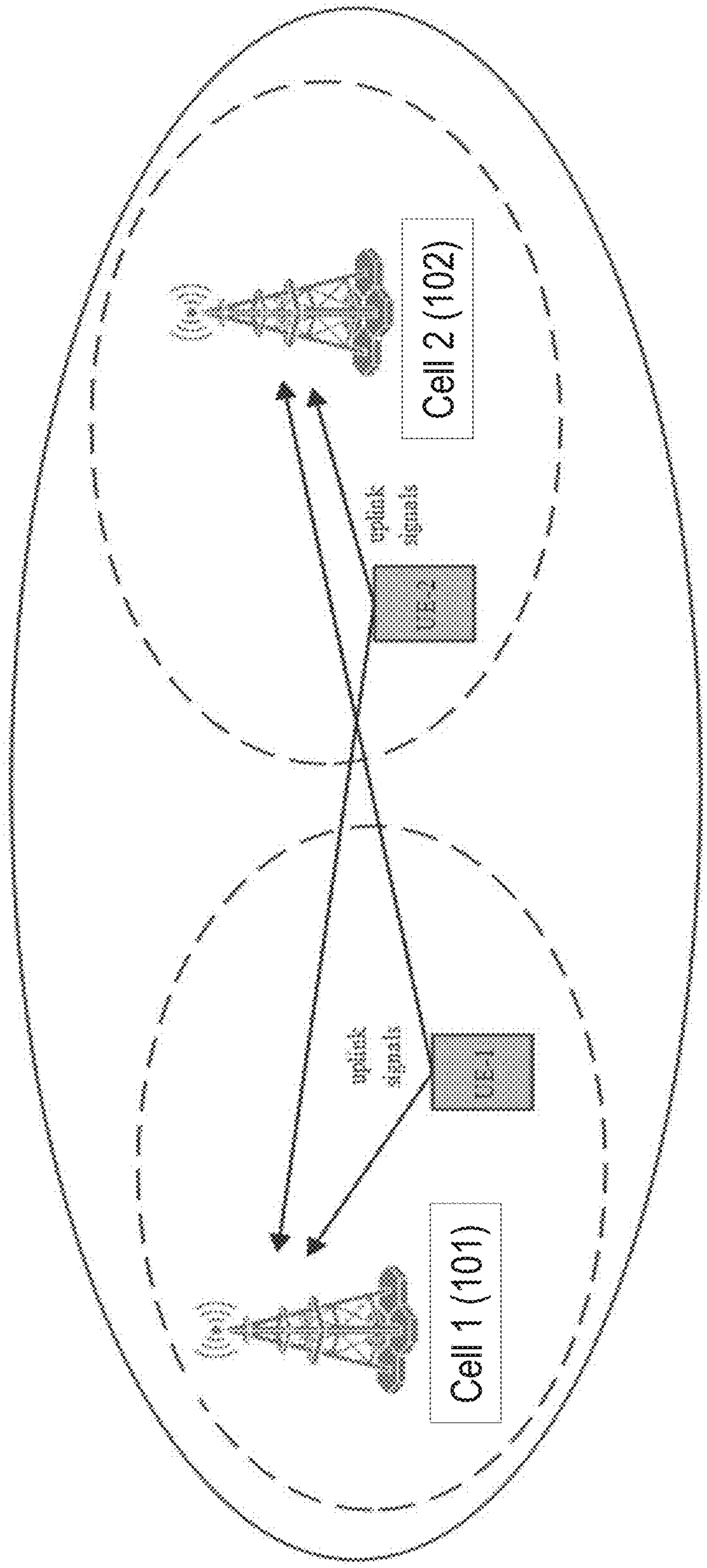
FIG. 1 illustrates an example inter-cell uplink transmission from multiple User Equipment (UEs).

FIG. 1 illustrates an example inter-cell uplink transmission 100 from multiple UEs. An uplink signal from the UE includes a signal (e.g., a Sounding Reference Signal, SRS) transmitted on the Physical Uplink Control Channel (PUCCH), a Physical Uplink Shared Chanel (PUSCH), and/or a Physical Random Access Channel (PRACH). As shown in FIG. 1, Cell 1 (101) and Cell 2 (102) are located in different geographical locations. The cells may also have different physical directions of panels. The cells can be referred to as transmission points (TRPs). In this patent documents, a TRP can be a base station/cell or some panels of a base station/cell. Furthermore, the TRP can be described using one or more transmission parameters, such as information grouping one or more reference signals, a resource set, a panel, a sub-array, an antenna group, an antenna port group, a group of antenna ports, a beam group, a physical cell index (PCI), a CORESET pool index, or a UE capability value or set. A TRP identifier (TRP-Id) comprises at least one of a CORESET pool index, a Synchronization Signal (SS)/Physical Broadcast Channel (PBCH) index, a transmission configuration indicator (TCI) state, a PCI, a Reference Signal (RS) set index, a panel index, a Channel State Information (CSI)-Reference (RS) index, and/or a beam group index.

Figure 2:
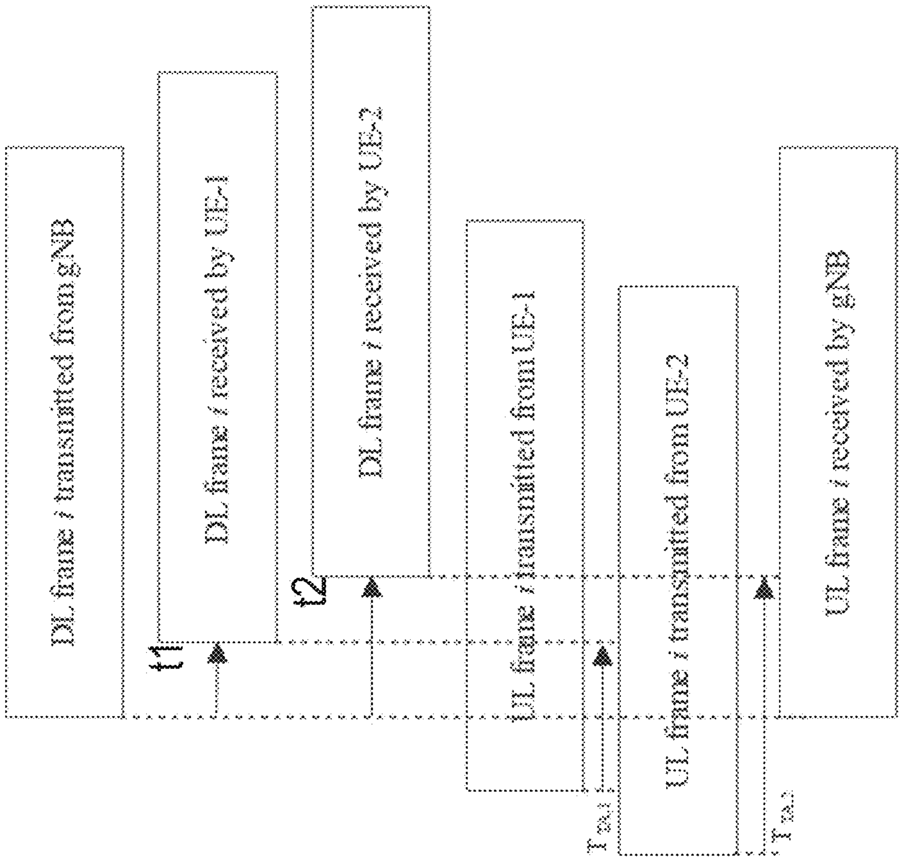
FIG. 2 illustrates an example uplink alignment for multiple UEs.

The different geographical locations as well as the different panel directions can result in different transmission delays for uplink and downlink signals. Uplink synchronization is performed to ensure arrival time of uplink signals from diverse UEs are within the range of cyclic preamble of the downlink sub-frame/slot/sub-slot (that is, the uplink signals from UEs are approximately aligned with each other). FIG. 2 illustrates an example uplink alignment 200 for multiple UEs. Because different UEs receive the same downlink frame at different time-domain positions (t1 and t2), the value of the timing advance ($T_{TA,1}$ for UE1 and $T_{TA2}$ for UE2) for the uplink frame as compared with the corresponding downlink frame needs to be different as well so that the same uplink frame from multiple UEs can be aligned in the time domain.

A timing alignment command (TAC) indicates adjustment of a current value of timing advance (TA) to a new value of TA and is used to enable the uplink timing alignment. Uplink timing alignment has been operated per Timing Alignment Group (TAG). Each TAG is associated with one or more serving cells. For example, in the case of carrier aggregation, the TA can be the same for different serving cells. That is, the same value of TA can be applied to serving cells associated with the same TAG. A TAG includes one or more serving cells that use the same TAC and can be identified using a TAG index or a TAG identifier (TAG-Id). A TAG having a TAG-Id that is 0 can be referred to as the PTAG, while the TAG(s) with TAG-Id not equivalent to 0 can be referred to as STAG(s).

Currently, transmission using multiple transmission points (m-TRP) has been widely implemented. M-TRP transmission can be achieved by multiple base stations or multiple panels of one base station. The m-TRP transmissions based on both single DCI and multi-DCI scheduling are supported by many communication systems. For mTRP transmission using multi-DCI scheduling (mDCI-mTRP), the TRPs can be configured to be transmission points in the same serving cell (intra-cell m-TRP) or different serving cells (inter-cell m-TRP). For inter-cell m-TRP operation, serving cells for TRPs can be associated with different TAGs, so that TRP-specific time alignment can be achieved by maintaining uplink timing per TAG.

Figure 3:
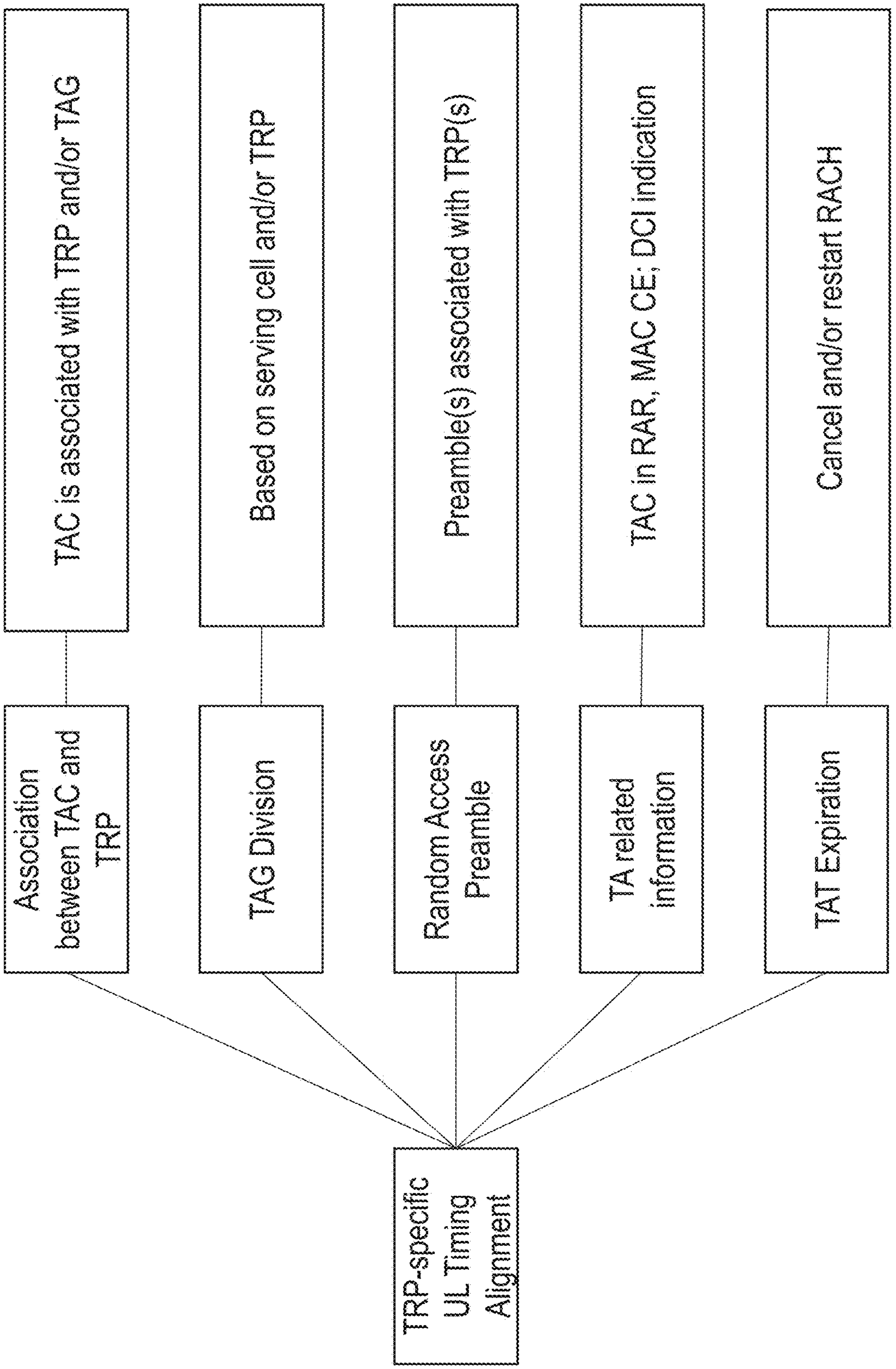
FIG. 3 illustrates an example framework for Transmission Point (TRP)-specific uplink timing alignment in accordance with one or more embodiments of the present technology.

For intra-cell m-TRP operations or the cases in which serving cells configured for each TRP are in the same TAG, different geographical locations of base stations or different physical directions of panels can result in different requirements for individual TRP-specific TA (or TAC) to ensure transmission reliability for each TRP link. This patent document discloses techniques that can be implemented in different embodiments to maintain uplink time alignment for multiple TRPs in different scenarios. FIG. 3 illustrates an example framework for TRP-specific uplink timing alignment in accordance with one or more embodiments of the present technology. In particular, a TAC can be associated with one or more specific TRP. TA parameters can be associated to respective TRPs so that UE can select different TA values for different TRPs. The association relationship can be derived by the UE implicitly or be indicated directly by the base station using some fields of signaling messages. In addition, the TAG can also be redefined to include TRP-related information. Preamble selection, TA offset determination, uplink transmission timing determination, as well as UE behavior upon the expiration of the Time Alignment Timer (TAT) can be updated to ensure proper uplink timing alignment for multi-TRPs.

These aspects are further described in the embodiments and examples below.

Embodiment 1

In order to maintain TA for uplink signal transmission per TRP, the UE can apply TAC to the corresponding TRP(s). That is, the TAC and corresponding TRP(s) can have an association that is either determined by the UE or signaled by the base station.

The UE receives a message (e.g., MAC CE or RAR) that includes one or more TACs from the base station. In some embodiments, the message includes a single TAC for the UE. The UE can apply the TAC to only one of the multiple TRPs. The UE can also receive a second message (e.g., MAC CE or DCI) indicating a second TRP that is associated with the TAC. The UE determines timing advance value for the second TRP according to the second message. In some embodiments, the UE applies the TAC to multiple TRPs. That is, the same TAC is applied to multiple TRPs. In some embodiments, the message includes multiple TACs and each of the TACs is associated with a corresponding TRP. The TACs can be different for different TRPs. Different TRPs can also share the same TAC. The UE applies the TAC(s) to the associated TRP(s) according to the message.

Figure 4A:
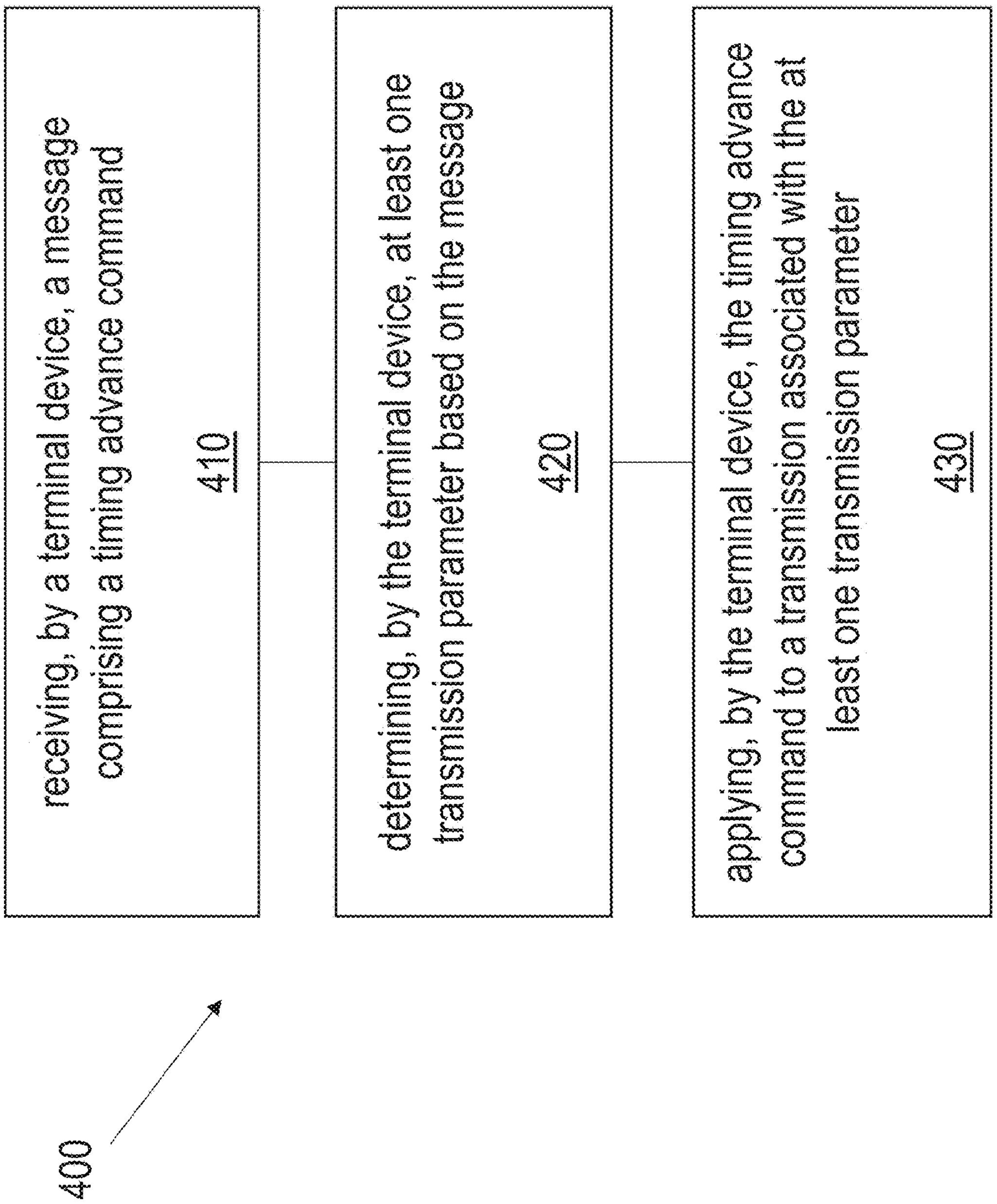
FIG. 4A is a flowchart representation of a method for wireless communication in accordance with one or more embodiments of the present technology.

FIG. 4A is a flowchart representation of a method 400 for wireless communication in accordance with one or more embodiments of the present technology. The method 400 includes, at operation 410, receiving, by a terminal device, a message comprising a timing advance command. The method 400 includes, at operation 420, determining, by the terminal device, at least one transmission parameter based on the message. The at least one transmission parameter is associated with the timing advance command. The method 400 includes, at operation 430, applying, by the terminal device, the timing advance command to a transmission associated with the at least one transmission parameter.

Figure 4B:
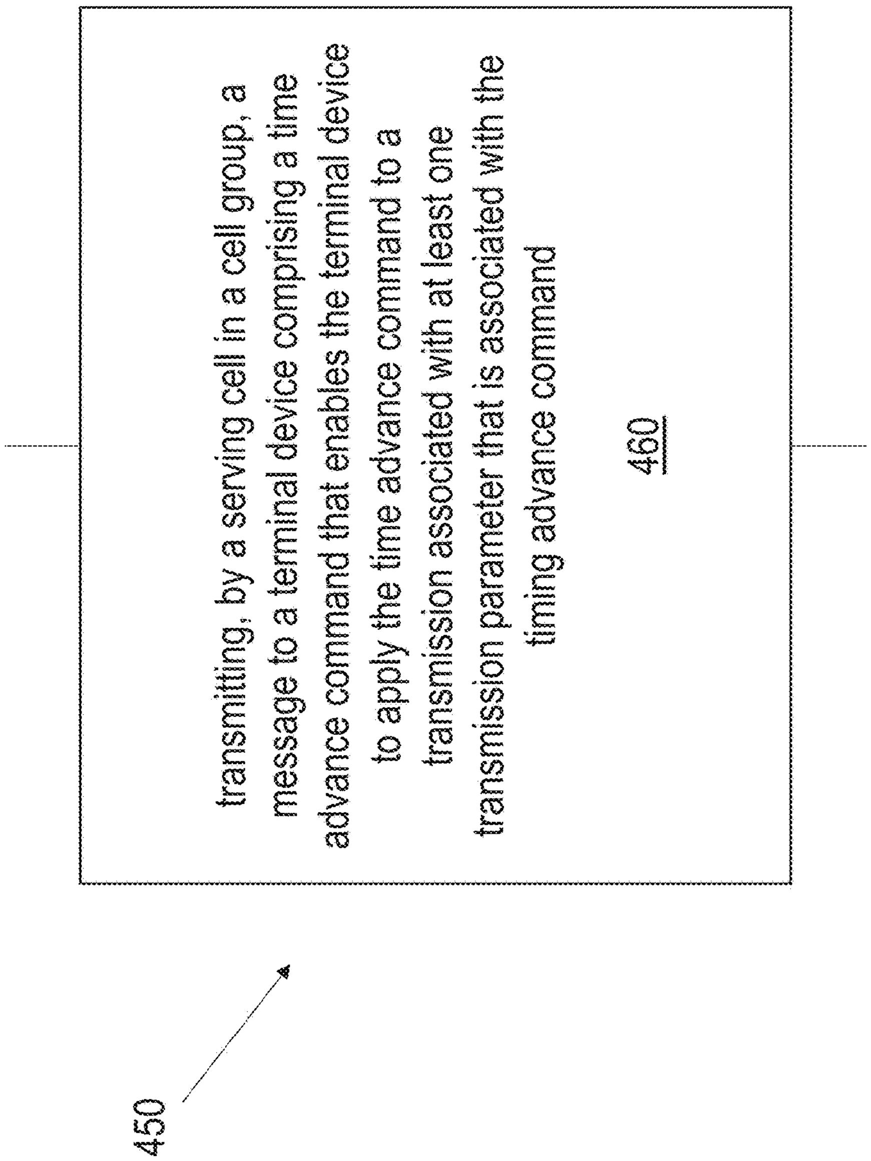
FIG. 4B is a flowchart representation of another method for wireless communication in accordance with one or more embodiments of the present technology.

FIG. 4B is a flowchart representation of a method 450 for wireless communication in accordance with one or more embodiments of the present technology. The method 450 includes, at operation 460, transmitting, by a serving cell in a cell group, a message to a terminal device. The message comprises a time advance command that enables the terminal device to apply the time advance command to a transmission associated with at least one transmission parameter that is associated with the timing advance command.

Here, the at least one transmission parameter is associated with at least one transmission points. As discussed above, the transmission parameter comprises information relevant to a transmission point, including least one of: information that groups one or more reference signals, a resource set, an antenna panel, a sub-array, an antenna group, an antenna port group, a group of antenna ports, a beam group, a PCI, a CORESET pool ID, a SS/PBCH index, a TCI state, or a UE capability value or set. The transmission comprises at least one of: a Physical Uplink Control Channel transmission, a Physical Uplink Shared Channel transmission, a Sounding Reference Signal transmission, or a Physical Random Access Channel transmission.

In some embodiments, the timing advance command indicates a value to adjust transmission timing for the transmission. In some embodiments, the message includes an identifier of the at least one transmission parameter (e.g., transmission point ID, TRP-Id).

Embodiment 2

To better facilitate uplink timing alignment for multi-TRP, the TAG-based indication scheme can be updated to be TRP specific. That is, each TAG can correspond to one or more TRPs or be divided into subgroups according to the association with the TRPs.

In some embodiments, each TAG that includes one or more serving cells is associated with one TRP. That is, the TRP and the TAG have a one-to-one correspondence. The UE receives a message (e.g., MAC CE or RAR) that includes a TAG-Id. The UE applies a TAC to the corresponding TRP according to the TAG-Id. In some embodiments, the message (e.g., the RRC message) includes both the TRP-Id and the TAG-Id. For example, the information element TAG-Config can include TAG-Id and the corresponding TRP-Id. The UE can apply the TAC information to the TRP according to the TAG-Id.

In some embodiments, each TAG can be associated with multiple TRPs (e.g., two TRP). That is, multiple TRPs can correspond to a TAG. In some embodiments, the message received by the UE (e.g., MAC CE or RAR) can include a TAG-Id and corresponding TAC information. The UE can apply the TAC information to a TRP in the TAG according to a default rule. In some embodiments, the message optionally includes a TRP-Id indicating the TRP in the TAG. The UE can apply the TAC to the TRP according to the TAG-Id and the specified TRP-Id in the message. Alternatively, or in addition, the message received by the UE can include a TAG-Id and TAC information for multiple TRPs. The multiple TAC fields are associated with different TRP(s) according to a particular order. The UE can determine a TAC among the multiple TACs according to the order and/or one or more default rules, and apply the TAC to the corresponding TRP.

In some embodiments, the message in methods 400, 450 as shown in FIG. 4A-4B further includes an identifier for a time alignment group, and the time alignment group is associated with at least one of a cell group or the at least one transmission parameter. In some embodiments, the cell group is a time alignment group that includes one or more serving cells sharing the timing advance command.

In some embodiments, the message includes multiple timing advance commands, each corresponding to one of the at least one transmission parameter in an order. In some embodiments, the message further includes multiple identifiers for one or more time alignment group. Each of the time alignment group includes one or more serving cells sharing the timing advance command. The order of the timing advance commands and/or time alignment groups is specified according to an index or an identifier of each of the at least one transmission parameter. In some embodiments, the method further includes applying each of the multiple timing advance commands to a transmission associated with a respective transmission parameter based on the order. In some embodiments, the method further includes applying each of the multiple timing advance commands to a transmission associated with a respective transmission parameter based on a received signaling message (e.g., DCI signaling). The signaling message can specify the order of the at least one transmission parameter.

Embodiment 3

As discussed above, uplink alignment is performed in the random-access procedures. For initial access procedures with multiple TRPs, in some embodiments, the UE accesses only one of the multiple TRPs. The UE can determine a preamble based on the system information received from the TRP. Other uplink alignment related parameters, such as Time Alignment Timer (TAT), one or more TA offsets, and/or one or more TACs, can be applied to all or at least part of the TRPs. For example, the UE accesses one TRP (e.g., TRP-1) in the initial access and accesses another TRP (e.g., TRP-2) after the initial access succeeds. Uplink alignment related parameters for TRP-1 can be applied to TRP-2 until random access procedure for TRP-2 succeeds. Alternatively, or in addition, the UE accesses multiple TRPs in initial access procedure and determines multiple preambles from preamble candidate groups for each TRP based on the system information. Uplink alignment related parameters for each TRP can be applied respectively. Here, the association between a group of preambles and a TRP can be indicated using a preamble group index.

For timing alignment with multiple TRPs in random access procedures, the UE can determine the random access preamble to transmit according to one or more rules. In some embodiments, the UE determines and transmits a preamble that is associated with one of the TRPs. In some embodiments, the UE determines and transmits multiple preambles (e.g., two preambles), with each preamble associated with a corresponding TRP. The multiple preambles can be transmitted simultaneously or in a same time domain unit, such as a slot, a sub-slot, a frame, or a RACH occasion. The UE can determine the transmission order of the multiple preambles and the transmission timing of the multiple preambles according to a signaling message from the base station or the serving cell.

In some embodiments, the UE determines preamble(s) to transmit based on the system information, a RRC signaling, and/or the PDCCH (e.g., DCI signaling). In some embodiments, the base station can configure one or more preamble groups. Each preamble group can be indexed or named explicitly to correspond to each TRP. The UE can select a preamble from the preamble group that corresponds to the TRP for random access. For example, preamble group with index 0 is used for TRP-1 and preamble group with index 1 is used for TRP-2. For random access using TRP-1, the UE can select a preamble from preamble group with index 0.

In some embodiments, the UE determines a preamble for a TRP based on the DCI format for the PDCCH order. For example, the UE determines and transmits a preamble associated with a TRP that has not been accessed successfully yet with a signaling from base station that includes a specific DCI format for PDCCH order. In some embodiments, the DCI format for PDCCH order can include a TRP related field (e.g., CORESET pool index). The UE determines which preamble is to be used based on the preamble index and the TRP related field. For example, UE determines a preamble with preamble index from the preamble group associated with TRP related field. In some embodiments, a codepoint in the SS/PBCH index field in the DCI format for PDCCH order can be associated with TRP-Id. The UE determines a preamble to transmit to a TRP based on the preamble index and SS/PBCH index field.

In some embodiments, the UE determines a preamble to use for each TRP based on the preamble index only. The preambles for multiple TRPs can be indexed jointly. For example, the base station configured N preambles, e.g., in an RRC signaling. Among the N preambles, X preambles are associated with a first TRP and the remaining (N−X) preambles are associated with a second, different TRP. The UE determines the association between a TRP and a preamble according to the configuration information in the RRC signaling.

Referring back to FIGS. 4A and 4B, in some embodiments, the message comprises a Random Access Response (RAR). In some embodiments, the RAR is associated with a random access preamble corresponding to the at least one transmission parameter.

In some embodiments, the method 400 includes determining, by the terminal device, one or more preambles associated with the at least one transmission parameter based on a signaling from a serving cell or a rule. The method 400 also includes transmitting, by the terminal device, the one or more preambles to the serving cell. In some embodiments, the signaling includes one or more preamble group index, and each preamble group includes one or more preamble configurations. In some embodiments, wherein each preamble group is associated with the at least one transmission parameter. In some embodiments, the rule specifies dividing preamble configurations into more than one parts, and each part is associated with at least one transmission parameter. In some embodiments, the transmitting comprises transmitting, by the terminal device, the one or more preambles to the serving cell in a same time-domain unit, the time-domain unit comprising a slot, a sub-slot, a frame, or a random-access occasion. In some embodiments, the one or more preambles are determined based on an indication from the serving cell. The indication comprises: a Downlink Control Information (DCI) format for a Physical Downlink Control Channel (PDCCH) order, a preamble index, a preamble group index or a Synchronization Signal (SS)/Physical Broadcast Channel (PBCH) index.

Embodiment 4

The variable $N_{TA,offset}$ represents the value of n-TimingAdvanceOffset configured for a serving cell. $N_{TA,offset}$ is configured for each serving cell in system information and is used to determine uplink timing advance. Different $N_{TA,offset}$ for the same serving cell can be configured by different TRPs.

The UE can receive different $N_{TA,offset}$ values from different TRPs, and select a value based on the received configurations. In some embodiments, the UE determines the uplink timing advance based on one $N_{TA,offset}$ associated with one of the TRPs and chooses to ignore the other values. For example, the $N_{TA,offset}$ value associated with the TRP that corresponds to the preamble (e.g., the first or the last transmitted preamble) can be selected, while the other $N_{TA,offset}$ values are ignored. In some embodiments, the UE determines the uplink timing advance based on an indication from the base station (e.g., an RRC signaling message) and ignores all the configured $N_{TA,offset}$ values.

Referring back to FIG. 4A, the method 400 can include receiving, by the terminal device, multiple timing advance offset values associated with the at least one transmission parameter; selecting, by the terminal device, a timing advance offset value from the multiple offset values; and applying, by the terminal device, the timing advance offset value to a transmission associated with any of the at least one transmission first parameter. In some embodiments, the timing advance offset comprises a value to adjust transmission timing for a transmission associated with a serving cell. In some embodiments, the at least one transmission parameter includes a first transmission parameter and a second transmission parameter. The transmission is associated with the first transmission parameter and the message comprises a timing advance command offset. The method further includes applying, by the terminal device, the timing advance command offset to a transmission associated with the second transmission parameter.

In some embodiments, the timing advance command offset indicates an offset value that is used to adjust a transmission timing for the transmission associated with the second transmission parameter as compared with the transmission associated with the first transmission parameter.

Embodiment 5

The Time Alignment Timer (TAT) is used to control how long the MAC entity of the UE considers the serving cells belonging to the associated TAG to be uplink time aligned. TAT can be specifically configured for each TAG. Alternatively, or in addition, a common TAT for all uplink serving cells can be applied. From the network perspective, the TAT starts or restarts when the base station sends the corresponding TAC to UE. From the UE's perspective, the TAT starts or restarts when the UE receives the TAC. When the TAT expires, uplink timing alignment corresponding to the TAT is out-of-sync, the UE behavior (e.g., flushing the Hybrid Automatic Repeat reQuest (HARQ) buffers, releasing PUCCH and/or SRS resources, and re-maintaining uplink time alignment) need to be adjusted.

In some embodiments, the UE can receive TAT configured for each TAG. When the TAT associated with the PTAG expires, the UE can cancel all uplink signal transmissions. Alternatively, or in addition, the UE can cancel uplink signal transmission associated with the TAG when the TAT associated with STAG expires.

In some embodiments, when a first TAG is in an out-of-sync state, the UE can apply the TAC associated with a second TAG that is in an in-sync state to the first TAG. The second TAG that is in-sync can be a PTAG or a STAG, and the first TAG that is out-of-sync can be a STAG. The UE initiates a random access procedure for a TAG or a TRP when the uplink signal transmission(s) are canceled due to TAT expiration.

Referring to FIG. 3, the time alignment group is in a synchronized state, and the method includes applying the timing advance command to a second transmission that is associated with a second transmission parameter. The second transmission parameter is associated with a second time alignment group that is in an out-of-sync state.

Embodiment 6

As shown in FIG. 2, the start time of uplink frames from UE is determined based on the downlink frame from a reference cell and timing advance related information. The UE can use different serving cells as reference for different TRPs. For intra-cell uplink transmission, one unified reference cell for multiple TRPs can be considered. UE can determine the reference cell according to a signaling from the base station (e.g., RRC). For example, the base station can indicate TRP-1 in the RRC signaling. The UE then determines a serving cell that is associated with TRP-1 as the reference cell.

Uplink frame number i for a transmission from the UE starts with a timing advance $$T_{TA,1} = \left(N_{TA,1} + N_{TA,offset} + N_{TA,adj}^{common} + N_{TA,adj}^{UE}\right)T_c$$

based on the start of the corresponding downlink frame from the reference cell at the UE. $N_{TA,1}$ is timing advance associated with a TRP, and $N_{TA,adj}^{common}$ and $N_{TA,adj}^{UE}$ are determined by the RRC signaling.

The UE can determine the timing of uplink frames for a TRP based on the timing of downlink frames and timing advance associated with the TRP. In some embodiments, for serving cells associated with the PTAG and a TRP associated with the Special Cell (SpCell), the UE can use the SpCell as the reference cell to determine the transmission timing. In some embodiments, for serving cells associated with the PTAG and a TRP not associated with the SpCell, UE can use any of the activated Secondary Cells (SCells) configured for the TRP as the reference cell to determine the transmission timing. In some embodiments, for servings cells associated with the STAG, the UE can use any of the activated SCells configured for a TRP as the reference cell to determine the transmission timing.

UE can determine the timing of uplink frames for multiple TRPs based on the timing of downlink frames associated with one of the multiple TRPs and timing advance associated with the corresponding TRP. In some embodiments, the UE can use a serving cell as the reference cell according to RRC signaling (e.g., CORESETPoolIndex in the RRC) to determine the transmission timing for other cells in the same TAG. When the TRP corresponding to the reference call is associated with the SpCell, UE uses the SpCell as the reference cell to determine transmission timing for the cells in the TAG. When the TRP corresponding to the reference cell is not associated with the SpCell, UE can use any of the activated SCells associated with the TRP to determine transmission timing for the cells in the TAG. For example, an uplink frame is determined based on the timing advance associated with TRP-1. The UE determines the transmission timing for uplink signals to TRP-1 according to uplink frame boundaries, and determines the transmission timing for uplink signals to TRP-2 according to uplink frame boundaries and the offset between timing advance of TRP-1 and TRP-2.

Figure 5:
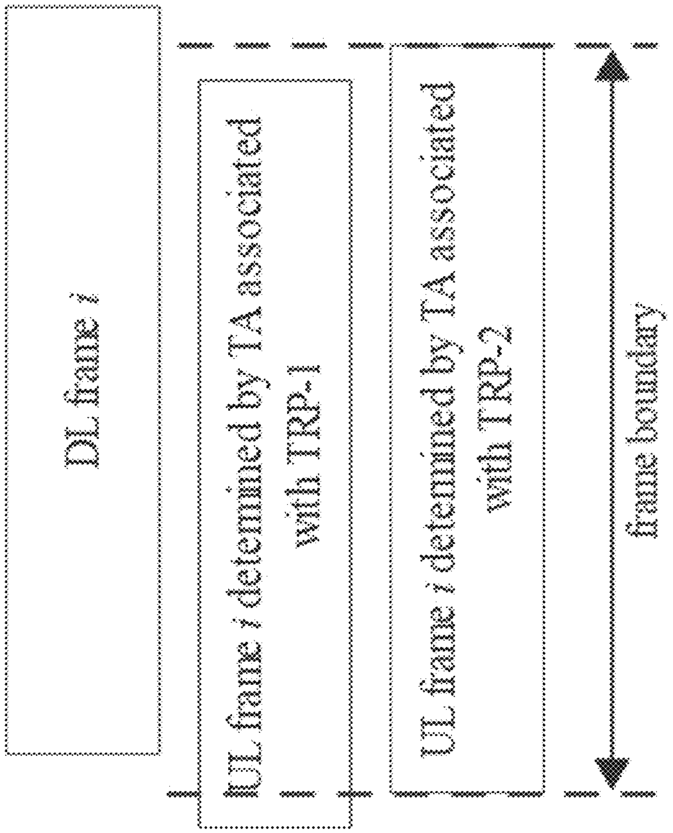
FIG. 5 illustrates an example TRP-specific timing advance for uplink frame determination in accordance with one or more embodiments of the present technology.

FIG. 5 illustrates an example TRP-specific timing advance for uplink frame determination in accordance with one or more embodiments of the present technology. As shown in FIG. 5, the UE receives a DL frame i. The UE determines the start time for UL frames associated with each TRP based on TA associated with the corresponding TRP and the downlink frame i from the reference cell. In this example, the UL frame i corresponding to TRP-1 has a different start time as compared to the UL frame i corresponding to the TRP-2.

Some additional examples of the disclosed techniques are further described below.

Example 1

In this example, the UE accesses only one of the TRPs in the initial access procedure by determining and transmitting a preamble according to the system information and/or a RRC signaling.

Figure 6:
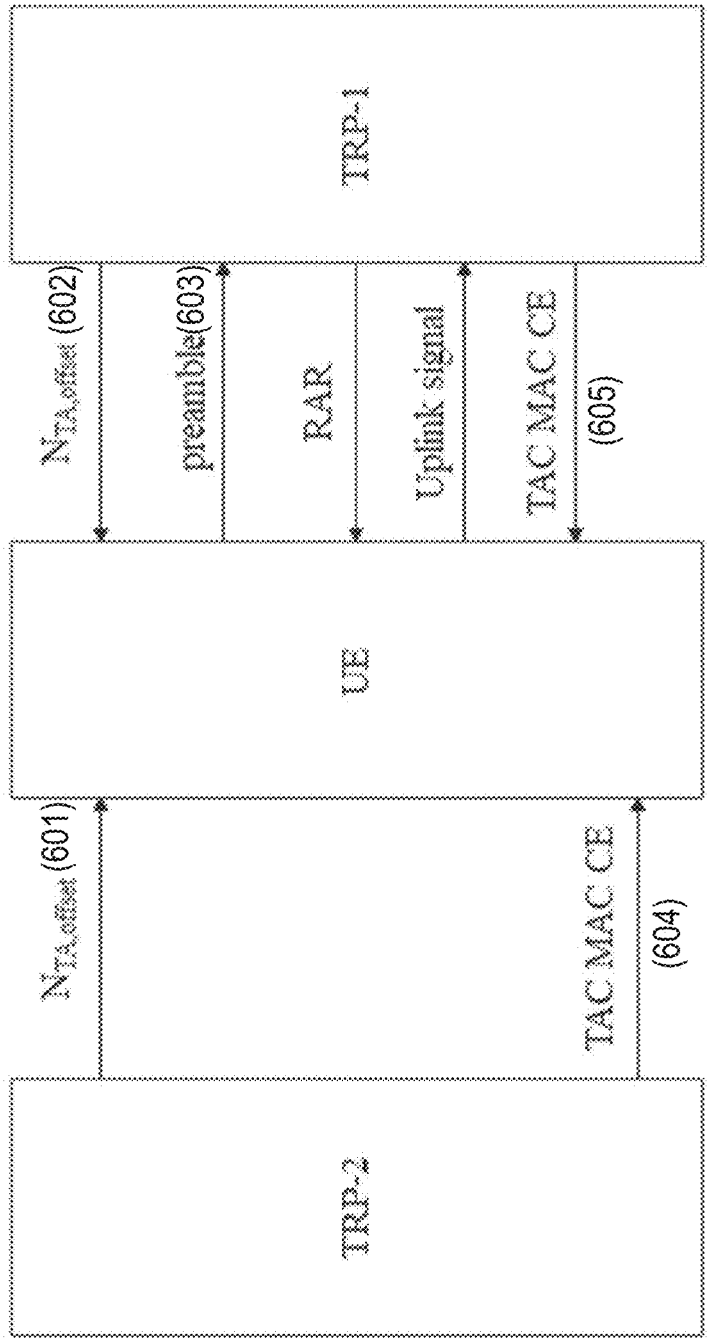
FIG. 6 illustrates an example uplink timing alignment procedure when accessing only one TRP in accordance with one or more embodiments of the present technology.

FIG. 6 illustrates an example uplink timing alignment procedure when accessing only one TRP in accordance with one or more embodiments of the present technology. The UE is configured with the same serving cell for two or more TRPs (e.g., TRP-1 and TRP-2). The serving cell is associated with two TAGs. The TAG that includes the primary serving cell has a TAG-Id=0 (also referred to as the PTAG). A first TRP for the initial access procedure is associated with the PTAG (e.g., TRP-1).

The UE is also configured with multiple $N_{TA,offset}$ values (601, 602). The UE transmits a preamble (603) corresponding to the first TRP and applies the $N_{TA,offset}$ value that is associated with the first TRP to determine the uplink transmission timing. The UE ignores the other $N_{TA,offset}$ values associated with other TRPs having other identifiers (e.g., TRP-2).

After the initial access, UE can transmit uplink signals to a second TRP without random access. The UE can receive another message (e.g., MAC CE or DCI) indicating the TA information for the second TRP, such as a TAC (604). The timing for the uplink signal to the second TRP can be determined by $N_{TA,offset}$ and TAC included in the MAC CE associated with the second TRP (604). In some embodiments, multiple TACs (604, 605), each corresponding to a TRP can be indicated by the base station. The value of timing advance is updated respectively for each TRP: $N_{TA,new}=N_{TA,old}+(T_A-31)\cdot 16\cdot 64/2^{\mu}$, where $N_{TA,old}$ is the current value of timing advance, $N_{TA,new}$ is the updated value, $T_A$ is the corresponding value of TAC, μ indicates the SCS, and the value 31 can be changed when the bit size of TAC in MAC CE changes.

The UE can receive different TAT configurations for different TRPs that are associated with the same TAG. Each TAT is applied to the respective TRP or uplink signals(s) of the respective TRP. When the TAT associated with the TAG for the accessed TRP (e.g., TRP-1) expires, UE clears resources and HARQ buffers for both TAGs, and re-initiates random access procedures. In some embodiments, when TAT associated with the TAG for the TRP without access (e.g., TRP-2) expires, UE applies TA related information (TAT and TAC) associated with the accessed TRP (e.g., TRP-1) to the out-of-sync TRP (e.g., TRP-2). In some embodiments, when TAT associated with the TAG for the TRP without access (e.g., TRP-2) expires, UE clears resources and HARQ buffers and stops transmitting any uplink signals associated with the corresponding TAG.

Example 2

In this example, the UE accesses one TRP in initial access procedure by determining and transmitting a first preamble according to the system information and the RRC signaling. The UE then accesses another TRP by determining and transmitting a second preamble according to the system information, RRC signaling and/or the DCI format for PDCCH order.

Figure 7:
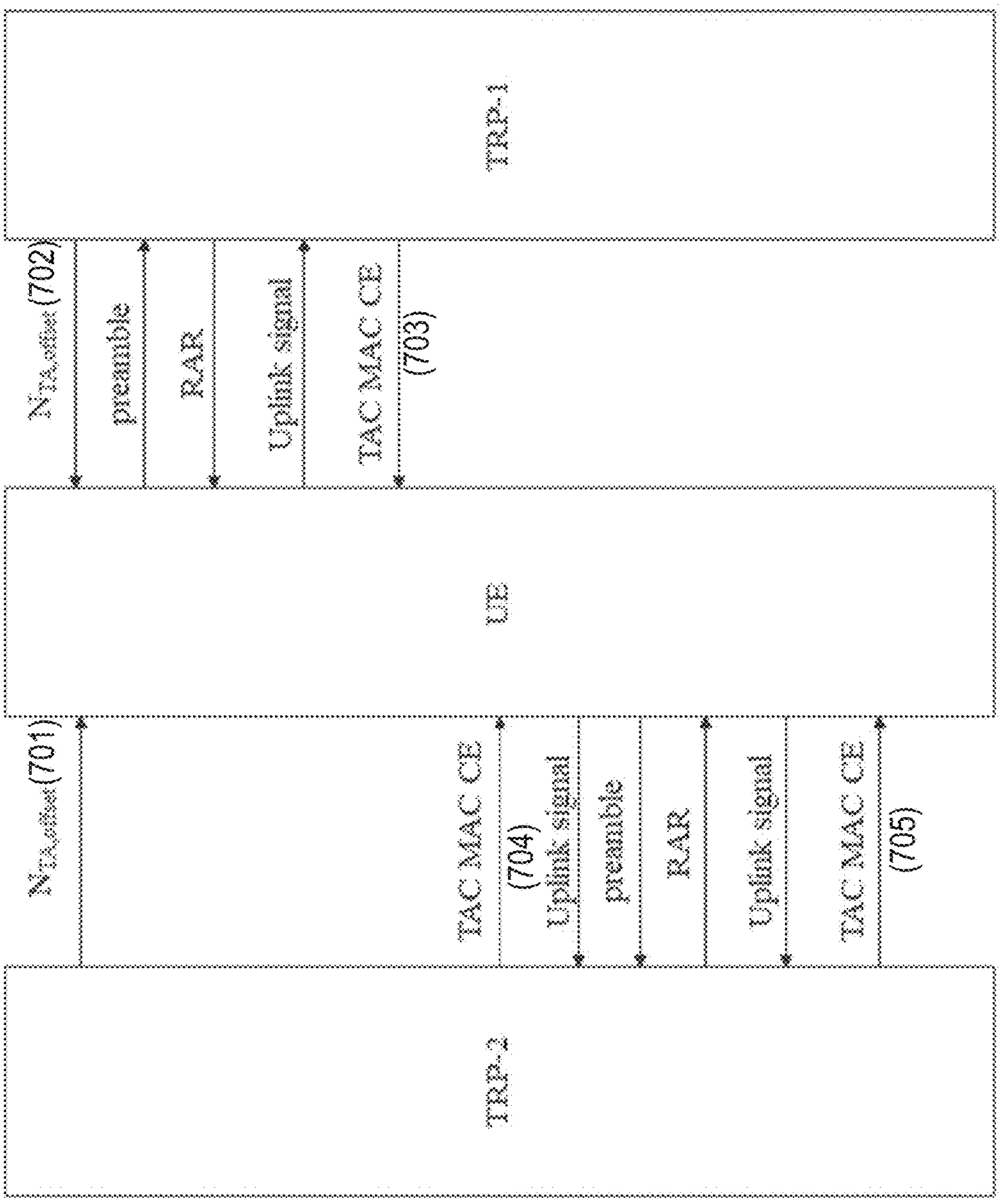
FIG. 7 illustrates an example uplink timing alignment procedure in which the TRPs are accessed by a specified order in accordance with one or more embodiments of the present technology.

FIG. 7 illustrates an example uplink timing alignment procedure in which the TRPs are accessed by a specified order in accordance with one or more embodiments of the present technology. The UE is configured the same serving cell for two or more TRPs (e.g., TRP-1, TRP-2). The serving cell is associated with two TAGs. The TAG that includes the primary serving cell has a TAG-Id=0 (also referred to as the PTAG). A first TRP for the initial access procedure is associated with the PTAG (e.g., TRP-1).

The UE first transmits one preamble for random access to TRP-1. After the random access to TRP-1 succeeds, the UE can transmit uplink signals to both TRPs (TRP-1 and TRP-2). The UE can then transmit a second preamble for random access to TRP-2. After the success of random access to TRP-2, UE determines uplink timing for TRP-2 based on TA related information associated with TRP-2.

The UE determines the preamble to transmit for random access based on preamble groups configured by base station. Each preamble group can be indexed, explicitly named, or predetermined for each TRP. For example, the preamble group with index 0 is used for TRP-1 and the preamble group with index 1 is used for TRP-2. As another example, the preamble group named PreambleGroupA is for TRP-1 and the preamble group named PreambleGroupB is for TRP-2. As yet another example, the first X preambles among the candidate preambles are for TRP-1 and the remaining preambles are for TRP-2. Here, X includes at least one half of the total number of candidate preambles.

The UE is also configured with multiple $N_{TA,offset}$ values (701, 702). The UE applies the value of $N_{TA,offset}$ associated with the TRP for the initial random access (e.g., TRP-1) and ignores the value of $N_{TA,offset}$ associated with other TRPs (e.g., TRP-2).

In some embodiments, the UE can transmit uplink signals to the non-accessed TRP (e.g., TRP-2) after the initial access succeeds. The UE then applies TA related information associated with the accessed TRP (e.g., TRP-1) to the non-accessed TRP (e.g., TRP-2) to determine the uplink timing advance. Alternatively, the UE applies TA related information associated with the non-accessed TRP (e.g., TRP-2) to determine the uplink timing advance. In some embodiments, the UE also performs the random access procedure with the a second TRP (e.g., TRP-2) using a second preamble. After the random access procedure with the second preamble succeeds, the UE determines uplink transmission timing for the second TRP based on TA related information associated with the second preamble.

After the initial access, the UE determines uplink transmission timing based on multiple TACs (703, 704) for each TRP that are indicated respectively by base station. The values of timing advance can be updated respectively for each TRP (e.g., 705): $N_{TA,new}=N_{TA,old}+(T_A-31)\cdot 16\cdot 64/2^{\mu}$, where $N_{TA,old}$ is the current value of timing advance, and $N_{TA,new}$ is the updated value, and $T_A$ is the corresponding value of TAC, μ indicates SCS, and the value 31 can be changed when the bit size of TAC in MAC CE changes.

When the TAT associated with the TAG for the first accessed TRP expires, UE clears resources and HARQ buffers for both TAGs, and re-initiates random access procedures. When TAT associated with the TAG for the second accessed TRP expires, UE applies TA related information (TAT and TAC) associated with the first accessed TRP to the out-of-sync TRP. In some embodiments, when TAT associated with the TAG for the TRP without access expires, UE clear resources and HARQ buffers and stops transmitting any uplink signals associated with the corresponding TAG.

Example 3

In this example, the UE accesses two TRPs in initial access procedure by determining and transmitting two separate preambles according to the system information and RRC signaling.

Figure 8:
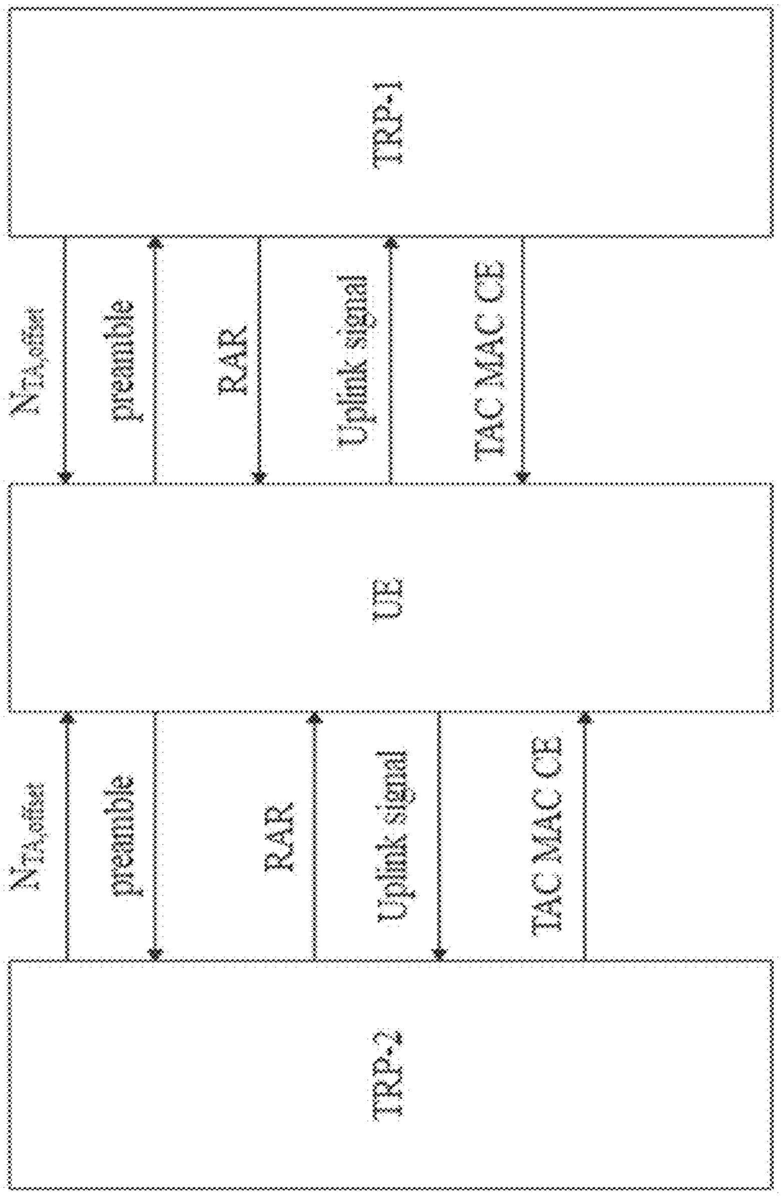
FIG. 8 illustrates an example uplink timing alignment procedure in which accessing multiple TRPs is performed simultaneously in accordance with one or more embodiments of the present technology.

FIG. 8 illustrates an example uplink timing alignment procedure in which accessing multiple TRPs is performed simultaneously in accordance with one or more embodiments of the present technology. The UE is configured the same serving cell for two or more TRPs (e.g., TRP-1, TRP-2). The serving cell is associated with two TAGs. The TAG that includes the primary serving cell has a TAG-Id=0 (also referred to as the PTAG). A first TRP for the initial access procedure is associated with the PTAG (e.g., TRP-1). UE determines preambles separately and applies TA information to each TRP respectively.

The UE determines the preamble to transmit for random access based on preamble groups configured by base station. Each preamble group can be indexed, explicitly named, or predetermined for each TRP. For example, the preamble group with index 0 is used for TRP-1 and the preamble group with index 1 is used for TRP-2. As another example, the preamble group named PreambleGroupA is for TRP-1 and the preamble group named PreambleGroupB is for TRP-2. As yet another example, the first X preambles among the candidate preambles are for TRP-1 and the remaining preambles are for TRP-2. Here, X includes at least one half of the total number of candidate preambles.

The UE is also configured with multiple $N_{TA,offset}$ values (701, 702). In some embodiments, the UE applies the value of $N_{TA,offset}$ associated with the TRP for the initial random access (e.g., TRP-1) and ignores the value of $N_{TA,offset}$ associated with other TRPs (e.g., TRP-2). In some embodiments, the UE applies the value of $N_{TA,offset}$ associated with the second accessed TRP (e.g., TRP-2) and replaces the value of $N_{TA,offset}$ associated with other TRPs (e.g., TRP-1). In some embodiments, UE applies the value of $N_{TA,offset}$ associated with the TRP that initiates/re-initiates random access procedures most recently, and replaces the currently applied value of $N_{TA,offset}$ In some embodiments, UE applies the value of $N_{TA,offset}$ provided by the RRC signaling and ignores $N_{TA,offset}$ associated with the multiple TRPs (e.g., TRP-1 and TRP-2). For example, the RRC signaling includes an indication field in ServingCellConfig, and the candidate values for $N_{TA,offset}$ include n0, n25600, and n39936.

The UE determines uplink signal transmission timing to each TRP based on a TAC included in MAC RAR associated with respective preambles. When UE accesses one of the TRPs successfully and receives a DCI format for PDCCH order to initiate random access procedure to another TRP, UE stops the current random access procedure and re-initiate random access procedure according to DCI format for PDCCH order.

After initial access, UE determines uplink transmission timing based on the multiple TACs for each TRP that are indicated respectively by base station. The value of timing advance is updated respectively for each TRP: $N_{TA,new}=N_{TA,old}+(T_A-31)\cdot 16\cdot 64/2^{\mu}$, where $N_{TA,old}$ is the current value of timing advance, and $N_{TA,new}$ is the updated value, and TA is the corresponding value of TAC, μ indicates SCS, and the value 31 can be changed when the bit size of TAC in MAC CE changes.

When the TAT associated with the PTAG expires, UE clears resources and HARQ buffers for both TAGs, and re-initiates random access procedures. When TAT associated with the STAG expires, UE applies TA related information (TAT and TAC) associated with the PTAG to the STAG. In some embodiments, when TAT associated with the STAG expires, UE clear resources and HARQ buffers and stops transmitting any uplink signals associated with the corresponding STAG.

In some embodiments, UE determines to apply TA related information associated with a PTAG to uplink signals associated with the STAG or stop transmitting any uplink signals associated with the corresponding STAG according to a signaling from the base station (e.g., RRC signaling).

Example 4

This example describes one or more rules of the association between TA-related configurations or indications and TRPs to enable the UE to apply a TAC to the corresponding TRP.

In some embodiments, TRP related information is included in TAG-Config of the RRC signaling. The TRP related information includes at least a TRP-Id, a CORESET pool index, a SS/PBCH index, a TCI state, a PCI, a RS set index, a panel index, a CSI-RS index, and/or a beam group index. UE applies the TAC associated with the TAG-Id to the corresponding TRP. The existing MAC CE structure for TAC can be reused.

Figure 9A:
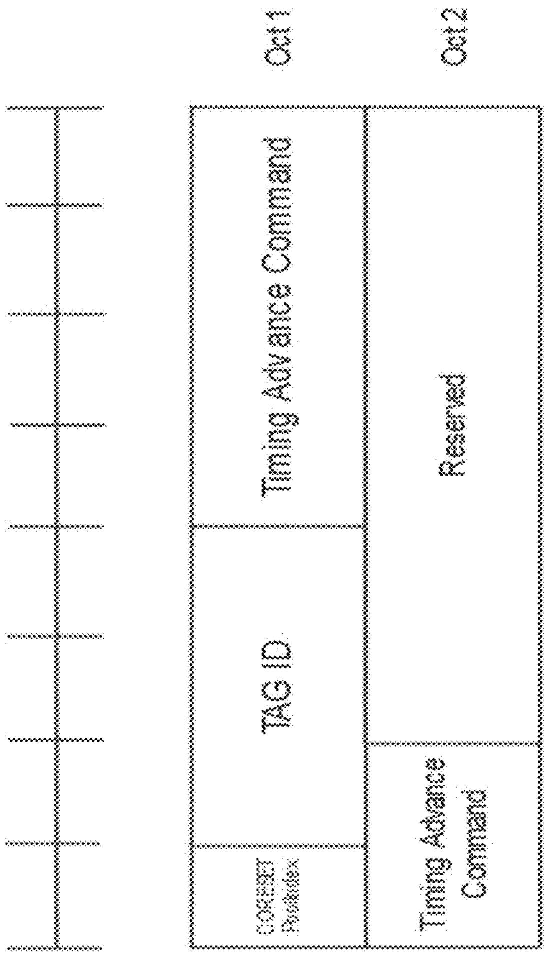
FIG. 9A illustrates an example Medium Access Control (MAC) Control Element (CE) structure that includes a TRP related field in accordance with one or more embodiments of the present technology.

In some embodiments, one TRP related field is included in MAC CE. FIG. 9A illustrates an example MAC CE structure that includes a TRP related field in accordance with one or more embodiments of the present technology. The TRP related field can include at least one of: a TAG-Id, a TAC, a TRP-Id, a CORESET pool index, a SS/PBCH index, a TCI state, a PCI, a RS set index, a panel index, a CSI-RS index, and/or a beam group index. UE applies the TAC in MAC CE to the serving cell associated with TAG-Id and the TRP associated with the TRP related field. The bit size of TAG-Id can be larger than 2 bits (e.g., 3 bits) considering that up to 8 or more TAGs can be configured.

Figure 9B:
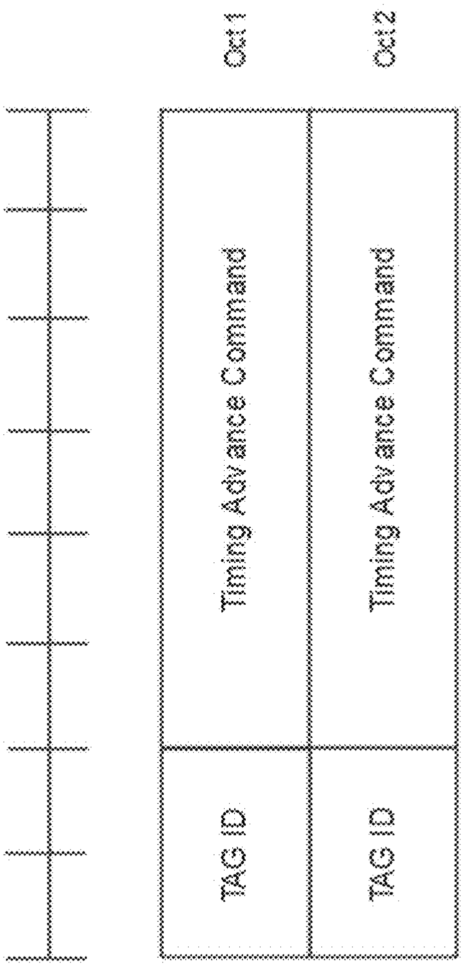
FIG. 9B illustrates an example MAC CE structure that includes multiple TAC fields associated with different TRP identifiers in a specific order in accordance with one or more embodiments of the present technology.

In some embodiments, more than one TAC fields are included in MAC CE. FIG. 9B illustrates an example MAC CE structure that includes multiple TAC fields associated with different TRP-Id(s) in a specific order in accordance with one or more embodiments of the present technology. The UE applies each TAC to the corresponding TRP. As shown in FIG. 9B, two TAC fields are included in MAC CE. The UE can apply the first TAC to TRP associated with the first TAG ID and apply the second TAC to TRP associated with the second TAG ID. When two TRPs are in the same TAG, the second TAG-Id can be the same as that of the first TAG-Id. In some cases, the bits for the second TAG-Id can be reserved.

In some embodiments, the UE applies TAC in MAC CE (or included the RAR) to one of the TRPs only (e.g., a first TRP). The UE can determine the timing advance value for a second TRP based on indication fields included in DCI formats. The indication fields can indicate TA value offset for the second TRP with respect to the TA value for the first TRP. The bit size of indication fields can be 6 or more bits. The DCI formats that include the TA offset indication fields can be DCI format 1_1, format 0_1, or other formats. Here, the first TRP can be the accessed TRP described in Example 1, the first accessed TRP described in Example 2, or the first successfully accessed TRP described in Example 3. The value of $N_{TA}$ for the second TRP is updated as: $N_{TA,2}=N_{TA,1}+(T_A-T_{A,max})\cdot 16\cdot 64/2^{\mu}$, where $N_{TA,1}$ is the current value of $N_{TA}$ for the first TRP, $T_A$ is the value indicated by DCI, $T_{A,max}$ is the absolute value of maximum TAC offset indicated by DCI. For example, when the size of indication fields is 6, the maximum of $T_A$ is 2^6−1, $T_{A,max}$ is (2^6−1)/2 or (2^6−1)/2±1. The negative or positive value of TAC offset $(T_A-T_{A,max})$ respectively indicates a corresponding amount of delaying or advancing the uplink transmission timing for the corresponding TRP compared with that for the reference TRP.

In some embodiments, one TRP related field is included in DCI format for PDCCH order, and can indicate at least TRP-Id, CORESET pool index, transmission configuration indicator (TCI) state, PCI, RS set index, panel index, CSI-RS index, beam group index. UE determines the preamble based on Random Access Preamble index and the TRP related field. For example, UE determines a preamble with preamble index indicated by Random Access Preamble index from the preamble group associated with TRP related field.

In some embodiments, a codepoint in SS/PBCH index field in the DCI format for PDCCH order can be associated with TRP-Id, and UE determines a preamble to transmit to a TRP based on Random Access Preamble index and SS/PBCH index field. The TRP-Id comprises at least a CORESET pool index, a TCI state, a PCI, a RS set index, a panel index, a CSI-RS index, and/or a beam group index.

Some embodiments may preferably implement the following solutions. A set of preferred solutions may include the following (e.g., as described with reference to Embodiments 1-6 and Examples 1-4).

1. A method for wireless communication, comprising receiving, by a terminal device, a message comprising a timing advance command; determining, by the terminal device, at least one transmission parameter based on the message, wherein the at least one transmission parameter is associated with the timing advance command; and applying, by the terminal device, the timing advance command to a transmission associated with the at least one transmission parameter.
2. The method of solution 1, wherein the at least one transmission parameter comprises information of at least one of: information that groups one or more reference signals, a resource set, an antenna panel, a sub-array, an antenna group, an antenna port group, a group of antenna ports, a beam group, a physical cell index (PCI), a CORESET pool identifier (ID), a Synchronization Signal (SS)/Physical Broadcast Channel (PBCH) index, a transmission configuration indicator (TCI) state, or a User Equipment (UE) capability value.
3. The method of solution 1 or 2, wherein the timing advance command indicates a value to adjust transmission timing for the transmission.

4. The method of any of solutions 1 to 3, wherein the transmission comprises at least one of: a Physical Uplink Control Channel transmission, a Physical Uplink Shared Channel transmission, a Sounding Reference Signal transmission, or a Physical Random Access Channel transmission.
5. The method of any of solutions 1 to 4, wherein the message includes an identifier of the at least one transmission parameter.
6. The method of any of solutions 1 to 5, wherein the message further includes an identifier for a time alignment group, and wherein the time alignment group is associated with at least one of a cell group or the at least one transmission parameter.
7. The method of any of solutions 6, wherein the cell group is a time alignment group that includes one or more serving cells sharing the timing advance command.
8. The method of any of solutions 1 to 7, wherein the message includes multiple timing advance commands, each corresponding to one of the at least one transmission parameter in an order.
9. The method of solution 8, wherein the message further includes multiple identifiers for one or more time alignment group, and wherein the time alignment group includes one or more serving cells sharing the timing advance command.
10. The method of solution 8, wherein the order is specified according to an index or an identifier of each of the at least one transmission parameter, the method further comprising applying each of the multiple timing advance commands to a transmission associated with a respective transmission parameter based on the order.
11. The method of solution 8, comprising applying each of the multiple timing advance commands to a transmission associated with a respective transmission parameter based on a received signaling message specifying an order of the at least one transmission parameter.
12. The method of solutions 6 to 11, wherein the time alignment group is in a synchronized state, and wherein the method further comprises applying the timing advance command to a second transmission, wherein the second transmission is associated with a second transmission parameter.
13. The method of solution 12, wherein the second transmission parameter is associated with a second time alignment group that is in an out-of-sync state.
14. The method of any of solutions 1 to 13, wherein the message comprises a Medium Access Control (MAC) Control Element (CE).
15. The method of any of solutions 1 to 13, wherein the message comprises a Random Access Response (RAR).
16. The method of solutions 15, wherein the RAR is associated with a random access preamble corresponding to the at least one transmission parameter.
17. The method of any of solutions 15 or 16, comprising determining, by the terminal device, one or more preambles associated with the at least one transmission parameter based on a signaling from a serving cell or a rule; and transmitting, by the terminal device, the one or more preambles to the serving cell.
18. The method of solution 17, wherein the signaling includes information indicating one or more preamble groups, and wherein each preamble group includes one or more preamble configurations.
19. The method of solution 18, wherein each preamble group is associated with the at least one transmission parameter.
20. The method of any of solutions 17 to 19, wherein the rule specifies dividing preamble configurations into more than one parts, and wherein each part is associated with at least one transmission parameter.
21. The method of any of solutions 17 to 20, wherein the transmitting comprises: transmitting, by the terminal device, the one or more preambles to the serving cell in a same time-domain unit, the time-domain unit comprising a slot, a sub-slot, a frame, or a random-access occasion.
22. The method of any of solutions 17 to 21, wherein the one or more preambles are determined based on an indication from the serving cell.
23. The method of solution 22, wherein the indication comprises: a Downlink Control Information (DCI) format for a Physical Downlink Control Channel (PDCCH) order, a preamble index, a preamble group index or a Synchronization Signal (SS)/Physical Broadcast Channel (PBCH) index.
24. The method of any of solutions 1 to 23, further comprising: receiving, by the terminal device, multiple timing advance offset values associated with the at least one transmission parameter; selecting, by the terminal device, a timing advance offset value from the multiple offset values; and applying, by the terminal device, the timing advance offset value to the transmission associated with the at least one transmission parameter.
25. The method of solution 24, wherein the timing advance offset comprises a value to adjust transmission timing for a transmission associated with a serving cell.
26. The method of any of solutions 1 to 25, wherein the at least one transmission parameter includes a first transmission parameter and a second transmission parameter, wherein the transmission is associated with the first transmission parameter, wherein the message comprises a timing advance command offset, the method further comprising applying, by the terminal device, the timing advance command offset to a transmission associated with the second transmission parameter.
27. The method of solutions 26, wherein the timing advance command offset indicates an offset value that is used to adjust a transmission timing for the transmission associated with the second transmission parameter as compared with the transmission associated with the first transmission parameter.
28. The method of any of solutions 24 to 27, wherein the message comprises a Downlink Control Information (DCI) message.
29. The method of any of solutions 6 to 28, further comprising receiving, by the terminal device, a first frame from one or more serving cells, and determining, by the terminal device, a start time of a second frame to be transmitted to the one or more serving cells based on the first frame associated with at least one reference serving cell and timing advancement information associated with the cell group.
30. The method of solution 29, wherein the at least one transmission parameter includes a first transmission parameter and a second transmission parameter, and wherein the one or more serving cells are associated with at least one of the first transmission parameter or the second transmission parameter.

31. The method of solution 29 or 30, wherein the at least one reference serving cell comprises one of serving cells included in the cell group.
32. The method of solution 31, wherein the cell group comprises one or more serving cells associated with one of the first transmission parameter or the second transmission parameter.
33. The method of any of solutions 29 to 32, wherein the timing advancement information includes the timing advance command, the timing advance offset, the timing advance command offset value in the message.
34. The method of any of solutions 29 to 33, wherein the cell group includes one or more serving cells sharing the timing advance command or the timing advance command offset.
35. The method of any of solutions 29 to 34, wherein the serving cell is in a cell group that includes a special cell comprising a primary cell and a primary secondary cell, and the reference serving cell is determined to be the special cell.
36. The method of any of solutions 29 to 35, wherein the serving cell is in a secondary cell group that includes one or more secondary cells, and the reference serving cell is determined to any one of the one or more secondary cells.
37. The method of any of solutions 29 to 36, wherein the at least one transmission parameter includes a first transmission parameter and a second transmission parameter, and wherein the one or more serving cells are associated with at least one of the first transmission parameter or the second transmission parameter.
38. The method of any of solutions 29 to 37, further comprising determining a time-domain position of a first transmission to the serving cell based on the start time of the second frame to the serving cell, wherein the first transmission is associated with the first transmission parameter; and determining a time-domain position of a second transmission to the serving cell based on the start time of the second frame to the serving cell and a timing advance command offset associated with the first transmission parameter and the second transmission parameter, wherein the second transmission is associated with the second transmission parameter.
39. The method of solution 38, wherein the timing advance command offset comprises an offset value between timing advances maintained for the first transmission parameter and the second transmission parameter.
40. A method for wireless communication, comprising transmitting, by a serving cell in a cell group, a message to a terminal device, wherein the message comprises a time advance command that enables the terminal device to apply the time advance command to a transmission associated with at least one transmission parameter that is associated with the timing advance command.
41. The method of solution 40, wherein the transmission comprises at least one of: a Physical Uplink Control Channel transmission, a Physical Uplink Shared Channel transmission, a Sounding Reference Signal transmission, or a Physical Random Access Channel transmission.
42. The method of solution 40 or 41, wherein the message includes an identifier of the at least one transmission parameter.
43. The method of any of clauses 40 to 42, wherein the message further includes an identifier for a time alignment group, and wherein the time alignment group is associated with at least one of a cell group or the at least one transmission parameter.
44. The method of solution 43, wherein the cell group is a time alignment group that includes one or more serving cells sharing the timing advance command.
45. The method of any of solutions 40 to 44, wherein the message includes multiple timing advance commands, each corresponding to one of the at least one transmission parameter in an order.
46. The method of solution 45, wherein the message further includes multiple identifiers for one or more time alignment group, and wherein the time alignment group includes one or more serving cells sharing the timing advance command.
47. The method of solution 45, wherein the order is specified according to an index or an identifier of each of the at least one transmission parameter.
48. The method of any of solutions 44 to 47, wherein the time alignment group is in a synchronized state, and wherein a second transmission parameter is associated with a second time alignment group that is in an out-of-sync state.
49. The method of any of solutions 40 to 48, wherein the message comprises a Medium Access Control (MAC) Control Element (CE).
50. The method of any of solutions 40 to 48, wherein the message comprises a Random Access Response (RAR).
51. The method of solution 50, wherein the RAR is associated with a random access preamble corresponding to the at least one transmission parameter.
52. The method of solutions 50 or 51, comprising receiving, by the serving cell from the terminal device, one or more preambles associated with the at least one transmission parameter.
53. The method of solution 52, comprising transmitting, by the serving cell, a signaling to the terminal device, wherein the signaling includes one or more preamble group index, and wherein each preamble group includes one or more preamble configurations.
54. The method of solution 53, wherein each preamble group is associated with the at least one transmission parameter.
55. The method of solution 53, wherein the receiving comprises receiving, by the serving cell, the one or more preambles in a same time-domain unit, the time-domain unit comprising a slot, a sub-slot, a frame, or a random-access occasion.
56. The method of solution 53, wherein the one or more preambles are determined based on an indication from the serving cell.
57. The method of solution 56, wherein the indication comprises: a Downlink Control Information (DCI) format for a Physical Downlink Control Channel (PDCCH) order, a preamble index, a preamble group index or a Synchronization Signal (SS)/Physical Broadcast Channel (PBCH) index.
58. The method of any of solutions 40 to 57, further comprising transmitting, by the serving cell, multiple timing advance offset values associated with the at least one transmission parameter to the terminal device; and receiving, by the serving cell, a transmission associated with the at least one transmission parameter, wherein the time advance offset value is applied to the transmission.

59. The method of any of solutions 40 to 58, wherein the at least one transmission parameter includes a first transmission parameter and a second transmission parameter, wherein the transmission is associated with the first transmission parameter, wherein the message comprises a timing advance command offset.

60. The method of solution 59, wherein the timing advance command offset indicates an offset value that is used to adjust a transmission timing for the transmission associated with the second transmission parameter as compared with the transmission associated with the first transmission parameter.

61. The method of solution 60, wherein the message comprises a Downlink Control Information (DCI) message.

62. A communication apparatus, comprising a processor configured to implement a method recited in any one or more of solutions 1 to 61.

63. A computer program product having code stored thereon, the code, when executed by a processor, causing the processor to implement a method recited in any one or more of solutions 1 to 61.

Figure 10:
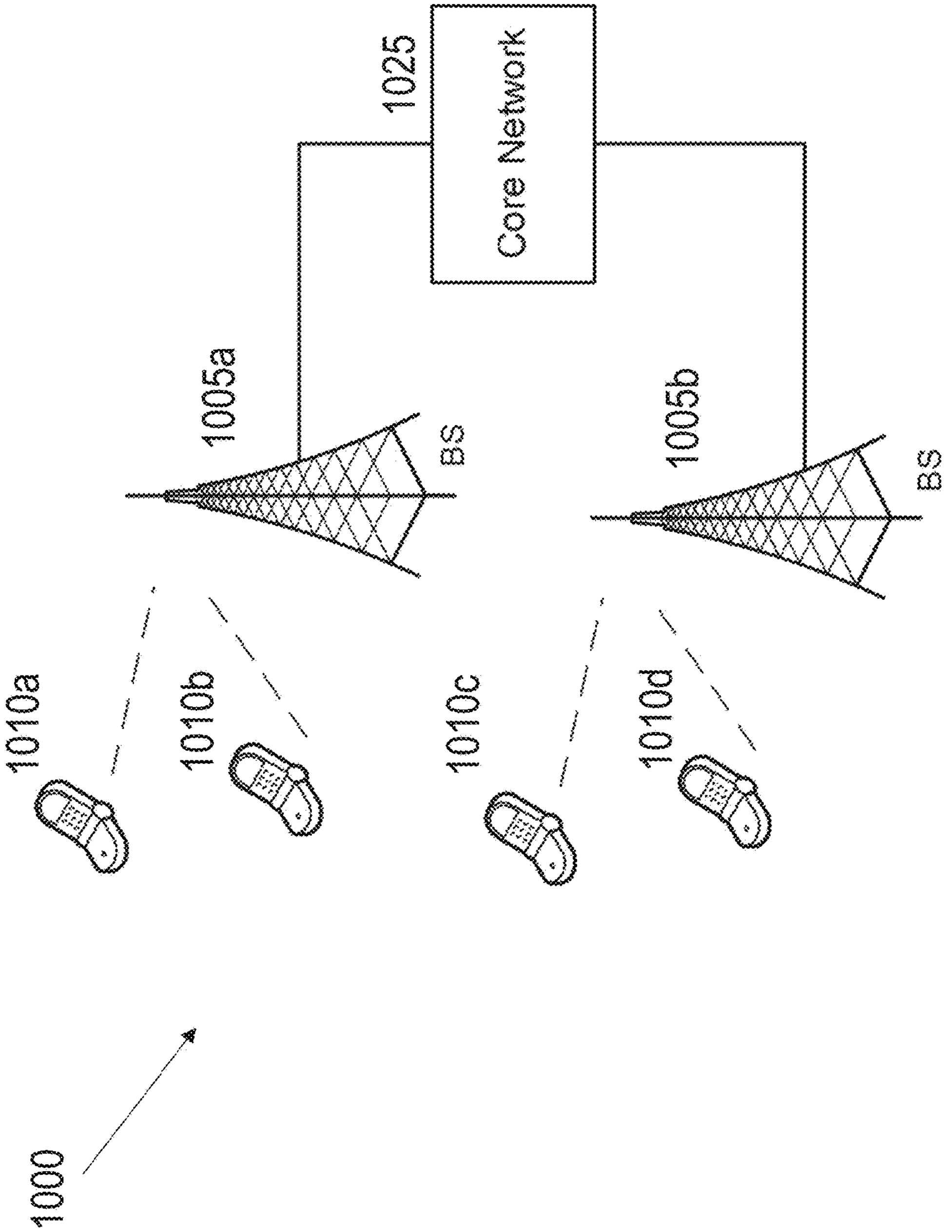
FIG. 10 shows an example of a wireless communication system where techniques in accordance with one or more embodiments of the present technology can be applied.

FIG. 10 shows an example of a wireless communication system 1000 where techniques in accordance with one or more embodiments of the present technology can be applied. A wireless communication system 1000 can include one or more base stations (BSs) 1005*a*, 1005*b*, one or more wireless devices (or UEs) 1010*a*, 1010*b*, 1010*c*, 1010*d*, and a core network 1025. A base station 1005*a*, 1005*b* can provide wireless service to user devices 1010*a*, 1010*b*, 1010*c* and 1010*d* in one or more wireless sectors. In some implementations, a base station 1005*a*, 1005*b* includes directional antennas to produce two or more directional beams to provide wireless coverage in different sectors. The core network 1025 can communicate with one or more base stations 1005*a*, 1005*b*. The core network 1025 provides connectivity with other wireless communication systems and wired communication systems. The core network may include one or more service subscription databases to store information related to the subscribed user devices 1010*a*, 1010*b*, 1010*c*, and 1010*d*. A first base station 1005*a* can provide wireless service based on a first radio access technology, whereas a second base station 1005*b* can provide wireless service based on a second radio access technology. The base stations 1005*a* and 1005*b* may be co-located or may be separately installed in the field according to the deployment scenario. The user devices 1010*a*, 1010*b*, 1010*c*, and 1010*d* can support multiple different radio access technologies. The techniques and embodiments described in the present document may be implemented by the base stations of wireless devices described in the present document.

Figure 11:
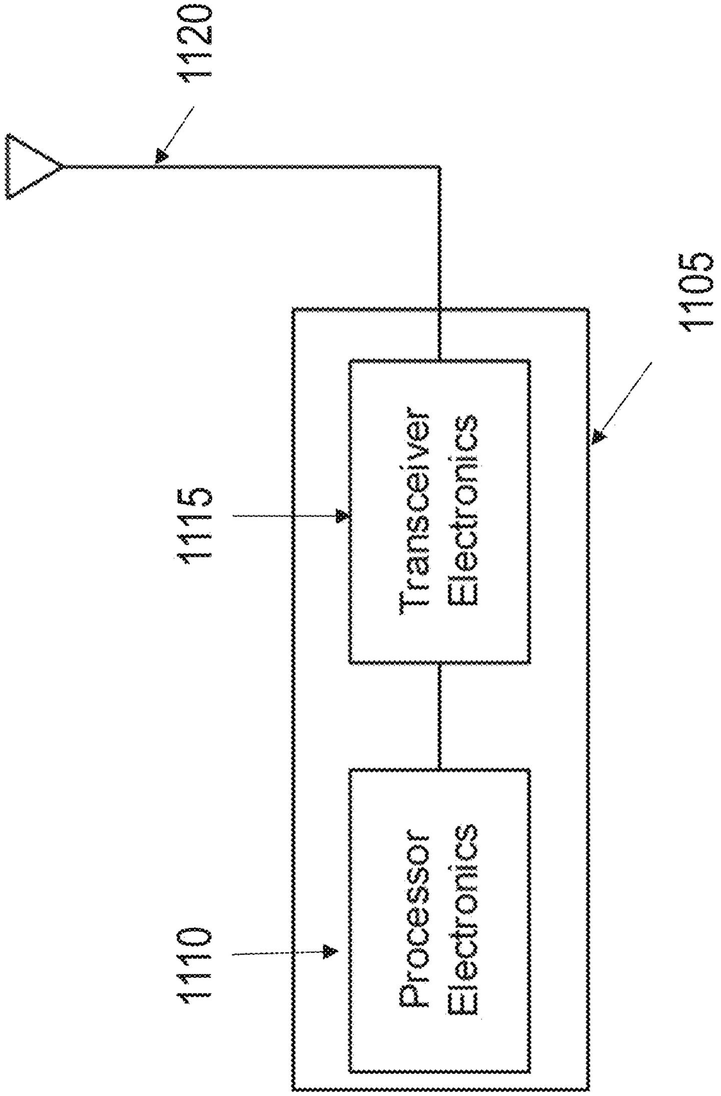
FIG. 11 is a block diagram representation of a portion of a radio station in accordance with one or more embodiments of the present technology can be applied.

FIG. 11 is a block diagram representation of a portion of a radio station in accordance with one or more embodiments of the present technology can be applied. A radio station 1105 such as a network node, a base station, or a wireless device (or a user device, UE) can include processor electronics 1110 such as a microprocessor that implements one or more of the wireless techniques presented in this document. The radio station 1105 can include transceiver electronics 1115 to send and/or receive wireless signals over one or more communication interfaces such as antenna 1120. The radio station 1105 can include other communication interfaces for transmitting and receiving data. Radio station 1105 can include one or more memories (not explicitly shown) configured to store information such as data and/or instructions. In some implementations, the processor electronics 1110 can include at least a portion of the transceiver electronics 1115. In some embodiments, at least some of the disclosed techniques, modules or functions are implemented using the radio station 1105. In some embodiments, the radio station 1105 may be configured to perform the methods described herein.

It will be appreciated that the present document discloses techniques that can be embodied in various embodiments to allow reliable uplink timing alignment for both inter-cell and intra-cell transmissions with multiple TRPs. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The disclosure of this application includes examples and implementations of certain features in the Fifth Generation (5G) wireless protocols and the applicability of the disclosed techniques is not limited to only 5G wireless systems and may be applied to other wireless systems While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments. Only a few implementations and examples are described, and other implementations, enhancements and variations can be made based on what is described and illustrated in this patent document.

What is claimed is:

1. A method for wireless communication, comprising:

determining, by a terminal device, a preamble associated with information related to one of multiple transmission configuration indicator (TCI) states based on a Downlink Control Information (DCI) signaling from a serving cell, wherein the information related to the one of the multiple TCI states comprises a physical cell index or coreset pool index, wherein configuration information in a Radio Resource Control (RRC) signaling defines an association between the information related to the one of the multiple TCI states and the preamble, and wherein the preamble is determined based on the DCI signaling and according to the association;

transmitting, by the terminal device, the preamble to the serving cell;

receiving, by the terminal device, a message comprising identifiers of multiple timing advance groups (TAGs) and identifiers of the multiple TCI states, wherein each of the multiple TCI states is associated with a timing advance group;

receiving, by the terminal device, a second message indicating information related to the one of the multiple TCI states; and applying, by the terminal device, a timing advance command associated with one of the multiple TAGs to a transmission associated with one of the multiple TCI states.

2. The method of claim 1, wherein the transmission comprises at least one of: a Physical Uplink Control Channel transmission, a Physical Uplink Shared Channel transmission, a Sounding Reference Signal transmission, or a Physical Random Access Channel transmission.

3. The method of claim 1, wherein the second message is associated with a random access preamble corresponding to the information related to one of the multiple TCI states.

4. The method of claim 1, wherein the DCI signaling comprises a field indicating the preamble associated with the information related to the one of the multiple TCI states.

5. A method for wireless communication, comprising:

transmitting, by a serving cell to a terminal device, a Downlink Control Information (DCI) signaling;

receiving, by the serving cell from the terminal device, a preamble associated with information related to one of multiple transmission configuration indicator (TCI) states based on the DCI signaling, wherein the information related to the one of the multiple TCI states comprises a physical cell index or coreset pool index, wherein configuration information in a Radio Resource Control (RRC) signaling defines an association between the information related to the one of the multiple TCI states and the preamble, and wherein the preamble is determined based on the DCI signaling and according to the association; and transmitting, by the serving cell, a message to the terminal device, wherein the message comprises identifiers of multiple time advance groups (TAGs) and identifiers of the multiple TCI states, wherein each of the multiple TCI states is associated with a timing advance group, wherein the message enables the terminal device to apply a time advance command associated with one of the multiple TAGs to a transmission associated with one of the multiple TCI states.

6. The method of claim 5, wherein the transmission comprises at least one of: a Physical Uplink Control Channel transmission, a Physical Uplink Shared Channel transmission, a Sounding Reference Signal transmission, or a Physical Random Access Channel transmission.

7. The method of claim 5, wherein the DCI signaling comprises a field indicating the preamble associated with the information related to the one of the multiple TCI states.

8. The method of claim 5, further comprising:

transmitting, by the serving cell, a second message indicating information related to the one of the multiple TCI states.

9. The method of claim 8, wherein the second message is associated with a random access preamble corresponding to one of the multiple TCI states.

10. A device for wireless communication, comprising at least one processor that is configured to:

determine a preamble associated with information related to one of multiple transmission configuration indicator (TCI) states based on a Downlink Control Information (DCI) signaling from a serving cell, wherein the information related to the one of the multiple TCI states comprises a physical cell index or coreset pool index, wherein configuration information in a Radio Resource Control (RRC) signaling defines an association between the information related to the one of the multiple TCI states and the preamble, and wherein the preamble is determined based on the DCI signaling and according to the association;

transmit the preamble to the serving cell;

receive a message comprising identifiers of multiple timing advance groups (TAGs) and identifiers of the multiple TCI states, wherein each of the multiple TCI states is associated with a timing advance group;

receive a second message indicating information related to the one of the multiple TCI states; and apply a timing advance command associated with one of the multiple TAGs to a transmission associated with one of the multiple TCI states.

11. The device of claim 10, wherein the transmission comprises at least one of: a Physical Uplink Control Channel transmission, a Physical Uplink Shared Channel transmission, a Sounding Reference Signal transmission, or a Physical Random Access Channel transmission.

12. The device of claim 10, wherein the second message is associated with a random access preamble corresponding to the information related to one of the multiple TCI states.

13. The device of claim 10, wherein the DCI signaling comprises a field indicating the preamble associated with the information related to the one of the multiple TCI states.

14. A device for wireless communication, comprising at least one processor that is configured to:

transmit, to a terminal device, a Downlink Control Information (DCI) signaling;

receive, from the terminal device, a preamble associated with information related to one of multiple transmission configuration indicator (TCI) states based on the DCI signaling, wherein the information related to the one of the multiple TCI states comprises a physical cell index or coreset pool index, wherein configuration information in a Radio Resource Control (RRC) signaling defines an association between the information related to the one of the multiple TCI states and the preamble, and wherein the preamble is determined based on the DCI signaling and according to the association; and transmit a message to the terminal device, wherein the message comprises identifiers of multiple time advance groups (TAGs) and identifiers of the multiple TCI states, wherein each of the multiple TCI states is associated with a timing advance group, wherein the message enables the terminal device to apply a time advance command associated with one of the multiple TAGs to a transmission associated with one of the multiple TCI states.

15. The device of claim 14, wherein the transmission comprises at least one of: a Physical Uplink Control Channel transmission, a Physical Uplink Shared Channel transmission, a Sounding Reference Signal transmission, or a Physical Random Access Channel transmission.

16. The device of claim 14, wherein the DCI signaling comprises a field indicating the preamble associated with the information related to the one of the multiple TCI states.

17. The device of claim 14, wherein the at least one processor is configured to:

transmit a second message indicating information related to the one of the multiple TCI states.

18. The device of claim 17, wherein the second message is associated with a random access preamble corresponding to one of the multiple TCI states.

* * * * *